United States Patent [19]
Ridgway

[11] 3,954,044
[45] May 4, 1976

[54] OVER AND UNDER MILLING MACHINE
[75] Inventor: William F. Ridgway, Rockford, Ill.
[73] Assignee: The Ingersoll Milling Machine Company, Rockford, Ill.
[22] Filed: Jan. 13, 1975
[21] Appl. No.: 540,500

[52] U.S. Cl. ................................. 90/21 D; 90/18; 90/21 R
[51] Int. Cl.² .................... B23C 9/00; B23C 1/04
[58] Field of Search ............. 90/19, 18, 21 C, 21 D, 90/86, 82, 78, 88; 269/56, 152; 214/1 BB

[56] References Cited
UNITED STATES PATENTS

| | | | |
|---|---|---|---|
| 2,312,355 | 3/1945 | Oberhoffken | 90/11 |
| 2,508,698 | 5/1950 | Von Beren | 214/1 BB X |
| 2,723,022 | 11/1955 | Van Schie | 198/218 |
| 2,829,565 | 4/1958 | Ungerer | 90/78 X |

FOREIGN PATENTS OR APPLICATIONS

| | | | |
|---|---|---|---|
| 894,185 | 10/1953 | Germany | 90/16 X |
| 1,150,644 | 6/1963 | Germany | 214/1 BB |

Primary Examiner—Willie G. Abercrombie
Assistant Examiner—W. R. Briggs
Attorney, Agent, or Firm—Wolfe, Hubbard, Leydig, Voit & Osann, Ltd.

[57] ABSTRACT

Upper and lower milling cutters scalp the top and bottom surfaces of an ingot as the ingot is advanced between the cutters by a carriage. The carriage comprises a pair of laterally spaced and longitudinally movable slides which support sharp-pointed plungers adapted to dig into the sides of the ingot to clamp and support the ingot for movement with the slides. The carriage formed by the slides and the plungers is of open-ended construction and is adapted to move into and out of straddling relationship with the ingot in order to reduce the dwell time of the carriage when picking up and releasing the ingot.

2 Claims, 5 Drawing Figures

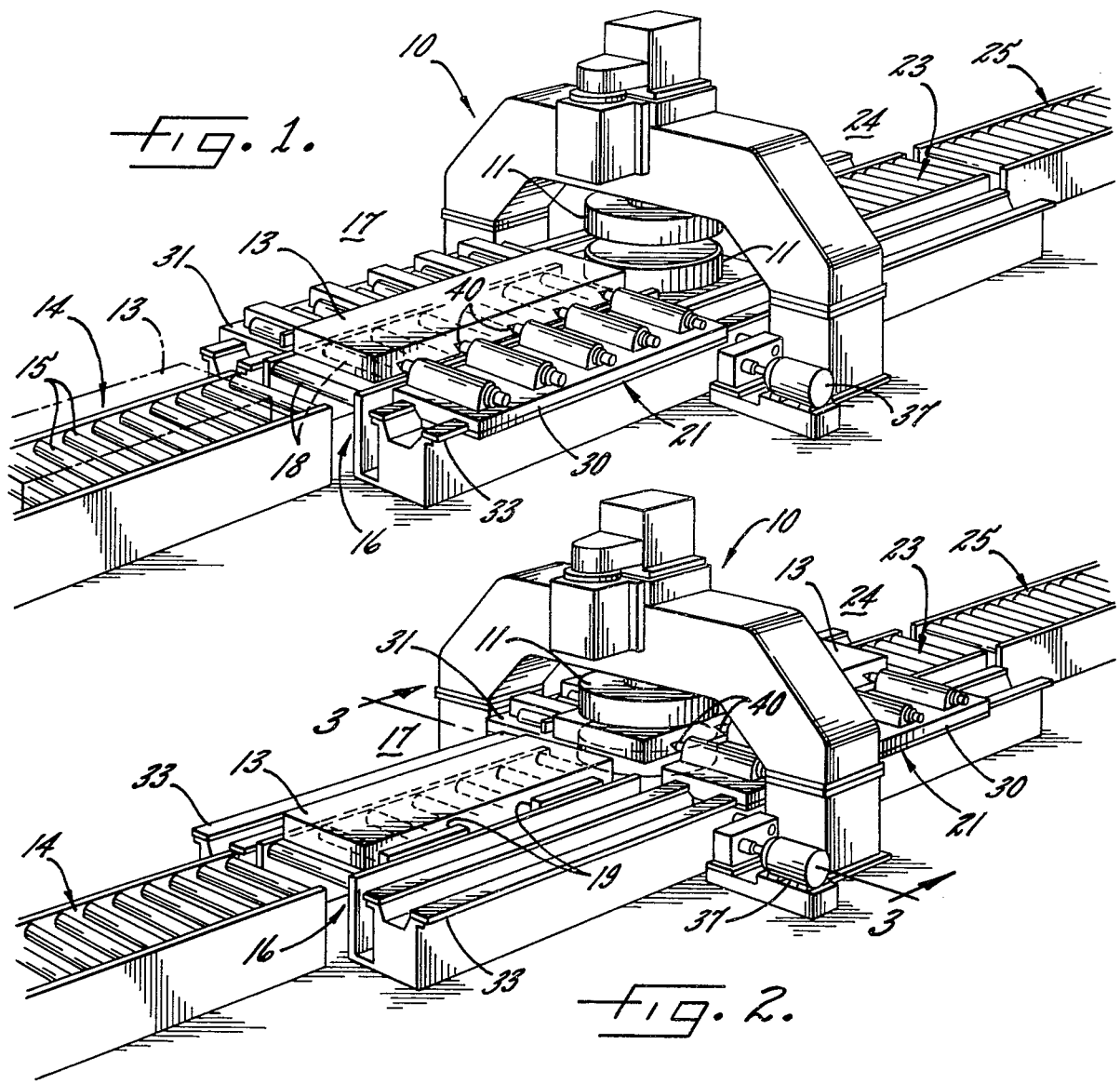
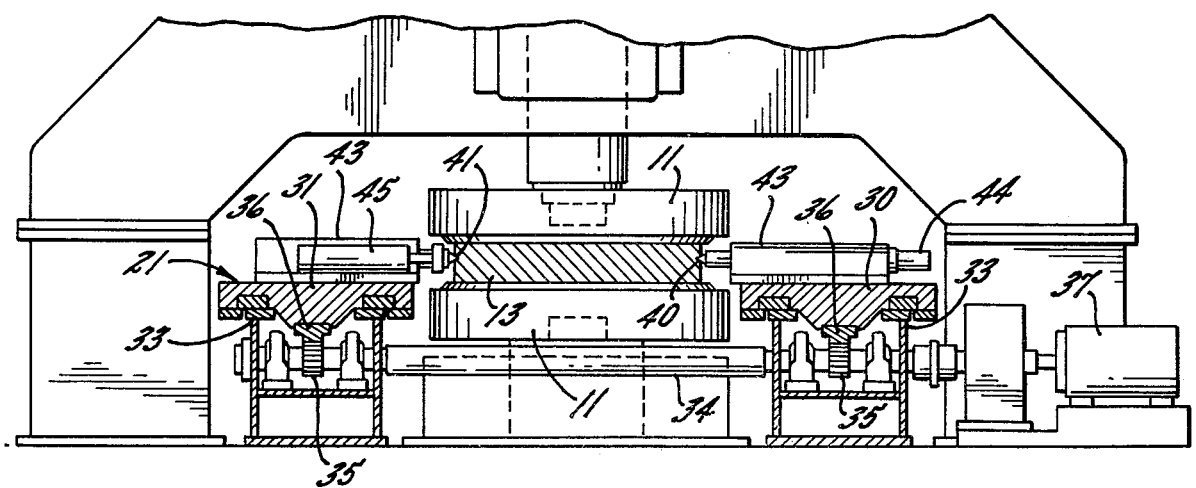

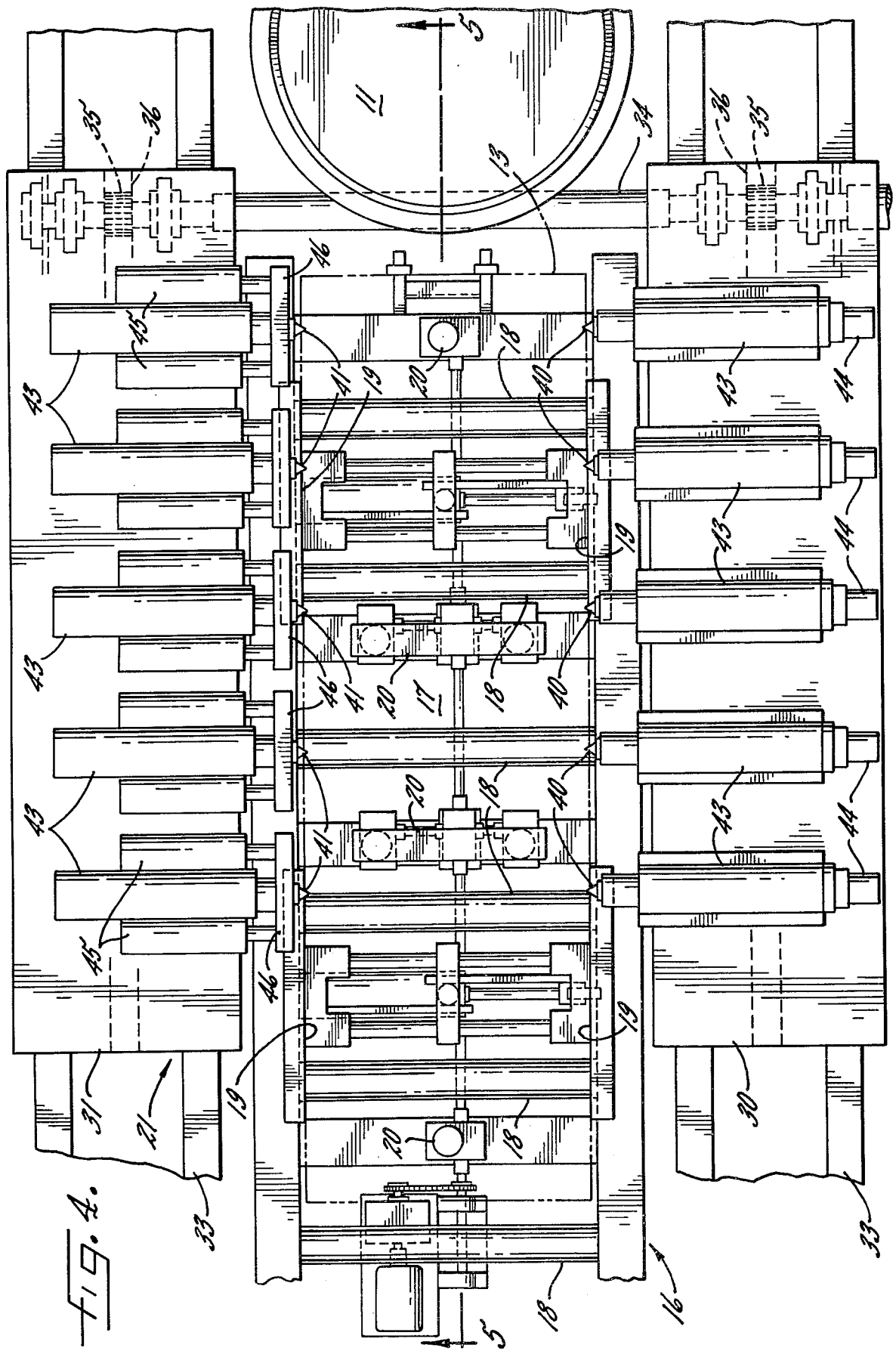

OVER AND UNDER MILLING MACHINE

BACKGROUND OF THE INVENTION

This invention relates generally to a milling machine and more particularly to a so-called over and under scalper of the type in which upper and lower cutters simultaneously mill the top and bottom surfaces of a slab of metal such as an ingot as the ingot is advanced between the cutters by a carriage. Usually, the ingot is advanced onto a load conveyor in a loading station where the ingot is shifted laterally and vertically into the proper cutting position prior to being advanced past the cutters by the carriage.

SUMMARY OF THE INVENTION

The general aim of the present invention is to provide a new and improved over and under scalper which is capable of handling longer ingots and operating in a more continuous manner than prior machines of the same general type.

A more detailed object is to provide a scalper having a unique open-ended carriage capable of moving lengthwise into straddling relationship with an ingot on the load conveyor and thereafter clamping the ingot for subsequent advancement with the carriage and past the cutters. By virtue of the open-ended carriage, one ingot may be adjusted into cutting position on the load conveyor while the carriage is returning toward the loading station, and then may be picked up and advanced by the carriage just shortly after the carriage returns to the loading station. Accordingly, there is no need for the carriage to wait for a long period of time in the loading station while the ingot is being adjusted. In addition, the open-ended carriage can easily handle ingots of various lengths and can be constructed to accommodate ingots of extremely long length.

The invention also resides in the provision of a carriage with novel sharp-pointed clamps which dig into the sides of the ingot and support the ingot for advancement with the carriage, the clamps being capable of effectively biting into the ingot even though the sides might be wavy and uneven or have a curved or angular shape.

These and other objects and advantages of the invention will become more apparent from the following detailed description when taken in conjunction with the accompanying drawings.

BRIEF DESCRIPTION OF THE DRAWINGS

FIG. 1 is a perspective view of a new and improved milling machine incorporating the unique features of the present invention.

FIG. 2 is a view similar to FIG. 1 but shows the carriage in a moved position.

FIG. 3 is an enlarged fragmentary cross-section taken substantially along the line 3—3 of FIG. 2.

FIG. 4 is a top plan view of the carriage and the load conveyor.

DETAILED DESCRIPTION OF THE PREFERRED EMBODIMENT

Figure 5:
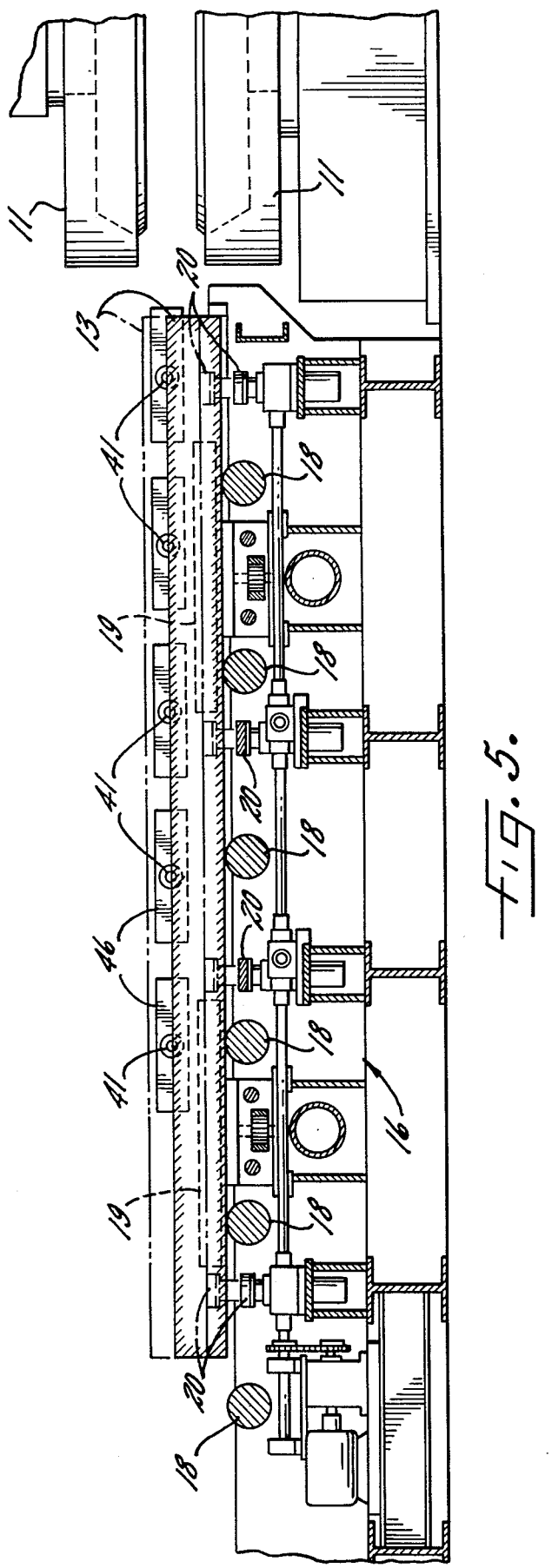
FIG. 5 is a fragmentary cross-section taken substantially along the line 5—5 of FIG. 4.

As shown in the drawings for purposes of illustration, the invention is embodied in a milling machine 10 of the type which is commonly referred to as an over and under scalper. Such a machine includes upper and lower vertically spaced milling cutters 11 adapted to be power-rotated about alined vertical axes and adapted to simultaneously mill the top and bottom surfaces of a metal slab or ingot 13 as the ingot is advanced along a horizontal path between the cutters.

Each rough ingot 13 is initially crane-loaded onto an entry conveyor 14 having power-rotated rollers 15 and then is advanced to and stopped on a load conveyor 16 located in a loading station 17, the load conveyor also having power-rotated rollers 18. While on the load conveyor 16, the ingot is shifted laterally so as to be centered laterally with respect to the cutters 11. In addition, the ingot is raised upwardly so as to position its top and bottom surfaces at the proper elevation relative to the cutters. For these purposes, the load conveyor 16 includes a series of laterally shiftable centering clamps 19 (FIGS. 4 and 5) which, when actuated, engage the laterally facing sides of the ingot and shift the ingot laterally into centered relationship with the cutters. The load conveyor further includes a plurality of vertically shiftable supports or jacks 20 which underlie the ingot and which may be actuated to raise the ingot to a preselected elevation as shown in phantom in FIG. 5.

After the ingot 13 has been properly adjusted on the load conveyor 16, a carriage 21 shifts the ingot horizontally off of the load conveyor and between the cutters 11 for milling of the top and bottom surfaces of the ingot (see FIG. 2). Upon completion of the milling, the carriage 21 releases the ingot and deposits the ingot on an unload conveyor 23 located in an unloading station 24 and having power-rotated rollers for advancing the ingot onto an exit conveyor 25 for further handling. After releasing the ingot 13, the carriage returns reversely toward the loading station 17 in order to pick up and subsequently advance another ingot.

In accordance with the present invention, the carriage 21 is of unique open-ended construction and is adapted to move into straddling relationship with an ingot 13 on the load conveyor 16 in the loading station 17. As a result, an ingot on the load conveyor can be adjusted into proper position while the carriage 21 is returning from the unloading station 24 and may be picked up and advanced by the carriage very shortly after the carriage returns to the loading station. Moreover, the open-ended carriage is capable of advancing ingots of various lengths and may be easily adapted to handle extremely long ingots.

More specifically, the carriage 21 comprises a pair of elongated members or slides 30 and 31 (FIGS. 3 and 4) disposed on opposite sides of the longitudinal centerline of the machine 10 and spaced apart by a distance somewhat greater than the width of the widest ingot 13 which the machine is capable of handling. The slides 30 and 31 are mounted to move back and forth between the loading and unloading stations 17 and 24 on a main support or bed 33 having ways for guiding the slides. To move the slides, a shaft 34 (FIG. 3) extends between the slides at an elevation located below the ingot and includes pinions 35 which mesh with elongated racks 36 extending along and anchored to the undersides of the slides. A reversible electric motor 37 is connected to the shaft and acts through the pinions and racks to advance and return the two slides in unison.

In order to cause the ingot 13 to advance with the slides 30 and 31, several clamps 40 and 41 (FIG. 4) are mounted on the upper side of the slides 30 and 31, respectively, and are spaced apart in a row along the respective slide. Herein, each clamp comprises a sharp-pointed plunger adapted to be advanced out of and retracted into a housing 43 on the slide. When the plungers 40 and 41 are advanced, their points dig into the sides of the ingot and thus lock the ingot to the slides. Being sharp-pointed, the plungers can obtain a secure bite on the ingot even though the sides of the ingot may be rough, uneven, curved or angular.

In this particular instance, the plungers 40 are adapted to be advanced and retracted by rotary hydraulic motors 44 (FIG. 4) while the plungers 41 are adapted to be advanced and retracted by hydraulic cylinders 45. Two cylinders 45 are associated with each plunger 41 and are connected to opposite ends of a bar 46 whose midportion is anchored to the plunger.

It will be seen that the carriage 21 formed by the slides 30 and 31 and the clamping plungers 40 and 41 defines an ingot-receiving throat having an open top, an open bottom and two open ends. Moreover, the open-throated carriage is free of any cross-element or obstruction which would engage an ingot 13 on the load conveyor 16 and prevent return movement of the carriage as the latter is retracted to the loading station 17. Thus, the carriage may move into straddling relationship with an ingot on the load conveyor 16 rather than the ingot being loaded vertically into the carriage as would be the case if the ends of the carriage were closed or obstructed.

To explain an operating cycle of the machine 10, let it be assumed that one ingot 13 has been picked up by the carriage 21 and is being advanced between the cutters 11. As soon as the first ingot begins advancing, a second ingot may be moved onto the load conveyor from the entry conveyor 14 (see FIG. 2).

After the first ingot has been milled, the plungers 40 and 41 release the first ingot onto the unload conveyor 23. Importantly, the carriage 21 may return reversely along the first ingot while the latter is being advanced from the unloading conveyor 23 to the exit conveyor 25. Indeed, the carriage may begin its return immediately after the plungers 40 and 41 have released the first ingot and thus the carriage does not dwell in the unloading station 24 for any significant period of time.

During the return of the carriage 21, the centering clamps 19 (FIG. 4) are actuated and shift the ingot 13 on the load conveyor 16 to the proper lateral position. The pressure on the centering clamps then is released while the jacks 20 are actuated to elevate the ingot to the proper cutting position. Most of the time required for elevation elapses while the carriage 21 is still returning and only approximately one-fourth of the total elevating time elapses after the carriage has been fully retracted. Accordingly, the returning slides 30 and 31 and plungers 40 and 41 move into straddling relationship with the sides of the ingot as the latter is being elevated. If desired, complete elevation of the ingot can be effected before the carriage has fully returned.

After the ingot 13 has been fully elevated, the centering clamps 19 are again applied in order to hold the ingot in a laterally centered position. Thereafter, fluid at low pressure is delivered to the motors 44 and the cylinders 45 to advance the plungers 40 and 41 until the plungers contact the sides of the ingot with low pressure and cause the motors and cylinders to stall. The centering clamps 19 then are retracted and fluid at high pressure is subsequently delivered to the cylinders 45 to cause the plungers 41 to dig securely into the adjacent side of the ingot and to cause the plungers 40 to bite into the opposite side of the ingot. Thereafter, the jacks 20 are lowered, whereupon the carriage 21 is advanced to shift the ingot 13 to the cutters 11. Advancement of the carriage may be initiated just as soon as the jacks move clear of the ingot and need not be delayed until the jacks are fully lowered.

Because the ingot 13 can be advanced onto the load conveyor 16 and either partially or fully adjusted while the carriage 21 completes its advance stroke and moves through its return stroke, only a relatively short interval (e.g., 45 seconds or less) is required between the time the carriage completes its return stroke and the time the carriage is ready for re-advancement with another ingot. Accordingly, the carriage need dwell in the loading station 17 for only a relatively short time and thus a substantially continuous flow of ingots can be maintained.

By virtue of the open-ended construction of the carriage 21 and the longitudinally spaced relationship of the plungers 40 and 41, the carriage can handle long ingots by using all of the plungers and can handle short ingots simply by leaving some of the plungers inactive. Also, the slides 30 and 31 can be increased in length and additional plungers added to the slides if it is desired to expand the capacity of the machine 10 and enable the machine to handle extremely long ingots.

I claim as my invention:

1. In a milling machine, the combination of, upper and lower vertically spaced milling cutters each supported to rotate about an upright axis, a support in a loading station, and a carriage adapted to pick up a slab on said support and to advance the slab to an unloading station along a horizontal path extending between said cutters thereby to enable simultaneous milling of the upper and lower surfaces of the slab during such advance, said carriage comprising a pair of horizontally spaced members disposed on opposite sides of said path and mounted to move back and forth between said stations, said carriage further including horizontally projecting clamps on said members, the clamps on each of said members projecting toward the clamps on the other member and being arranged in a row extending along said path, the clamps on each member being movable toward the clamps on the other member to clamping positions and being movable away from the clamps on the other member to released positions, said clamps being operable when in said clamping positions to engage the laterally facing sides of a slab on said support and hold the slab for movement with said members, means for moving said clamps to said clamping positions, for effecting relative vertical shifting between said slab and said support to space the slab vertically above the support, for moving said carriage and the clamped slab past said cutters from said loading station to said unloading station, for moving said clamps to said released positions to leave the milled slab in said unloading station and for returning said carriage toward said loading station, the carriage formed by said members and the released clamps defining a slab-receiving throat which is open at its top, bottom and ends and which is free of any slab-engaging obstruction that would prevent return movement of said carriage into said loading station while a slab is located in the loading station.

2. A milling machine as defined in claim 1 in which said clamps comprise sharp-pointed plungers, there being a row of said plungers extending along each of said members.

* * * * *